(12) United States Patent
Backof, Jr. et al.

(10) Patent No.: US 7,970,430 B2
(45) Date of Patent: Jun. 28, 2011

(54) METHOD AND APPARATUS FOR SETTING AND MANAGING OPERATIONAL DYNAMICS WITHIN COGNITIVE RADIO NETWORKS

(75) Inventors: Charles A. Backof, Jr., Boca Raton, FL (US); Steven D. Bromley, Concord, MA (US); John D. Bruner, South Barrington, IL (US); Lawrence M. Ecklund, Wheaton, IL (US); Steven F. Gillig, Roselle, IL (US); John K. Grosspietsch, Libertyville, IL (US); Whay Chiou Lee, Cambridge, MA (US); Scott E. Preece, Champaign, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 850 days.

(21) Appl. No.: 11/614,403

(22) Filed: Dec. 21, 2006

(65) Prior Publication Data
US 2008/0155249 A1   Jun. 26, 2008

(51) Int. Cl.
*H04M 3/00* (2006.01)
*H04M 1/00* (2006.01)
*H04W 24/00* (2009.01)
(52) U.S. Cl. ............... 455/550.1; 455/418; 455/456.1; 455/456.3; 455/552.1
(58) Field of Classification Search .......... 455/418, 455/550.1, 552.1, 456.1, 456.3; 713/100
See application file for complete search history.

(56) References Cited

U.S. PATENT DOCUMENTS

| | | | |
|---|---|---|---|
| 5,745,879 A | 4/1998 | Wyman | |
| 5,946,634 A | 8/1999 | Korpela | |
| 6,029,144 A | 2/2000 | Barrett et al. | |
| 6,055,229 A | 4/2000 | Dorenbosch et al. | |
| 6,430,698 B1 * | 8/2002 | Khalil et al. | 714/4 |
| 6,768,901 B1 | 7/2004 | Osborn et al. | |
| 6,795,688 B1 * | 9/2004 | Plasson et al. | 455/41.2 |
| 6,963,573 B1 | 11/2005 | Cain et al. | |
| 6,973,335 B2 | 12/2005 | Ganton | |
| 7,016,695 B1 | 3/2006 | Bahai | |
| 7,076,246 B2 | 7/2006 | Chitrapu | |
| 2002/0184374 A1 * | 12/2002 | Morikawa | 709/229 |
| 2003/0040328 A1 | 2/2003 | Indirabhai | |
| 2004/0028003 A1 | 2/2004 | Diener | |
| 2004/0047324 A1 | 3/2004 | Diener | |

(Continued)

FOREIGN PATENT DOCUMENTS
WO   2007-082244 A2   7/2007

OTHER PUBLICATIONS

Eric Nicollet et al., "Specification and Preliminary Design of Mechanisms and Processes Enabling End-to-End Dynamic Reconfiguration," End-to-End Reconfigurability II—E2R II, Sixth Framework Programme, Aug. 9, 2006, 134 pages in 2 parts.

(Continued)

*Primary Examiner* — Marisol Figueroa

(57) ABSTRACT

In certain embodiments, a method for managing operational parameters of a cognitive radio device to minimize non-compliance with a regulatory policy involves sensing a change in an operational condition that will affect compliance with a current operational policy; estimating a time at which the current operational policy will become invalid; selecting a method for determining how to update the current operational policy; and updating the current operational policy of the cognitive radio device. Other embodiments may incorporate more, fewer or other elements.

11 Claims, 11 Drawing Sheets

U.S. PATENT DOCUMENTS

| | | | |
|---|---|---|---|
| 2004/0137905 A1* | 7/2004 | Jeong et al. | 455/450 |
| 2005/0048963 A1 | 3/2005 | Kubler et al. | |
| 2005/0058153 A1 | 3/2005 | Santhoff et al. | |
| 2005/0125494 A1* | 6/2005 | Horii et al. | 709/203 |
| 2005/0130653 A1* | 6/2005 | Bisdikian et al. | 455/432.3 |
| 2005/0169221 A1 | 8/2005 | Bennett | |
| 2006/0009209 A1 | 1/2006 | Rieser et al. | |
| 2006/0023686 A1 | 2/2006 | Jeong et al. | |
| 2006/0083205 A1 | 4/2006 | Buddhikot et al. | |
| 2006/0088010 A1 | 4/2006 | Buchwald et al. | |
| 2006/0211404 A1* | 9/2006 | Cromp et al. | 455/405 |
| 2006/0256884 A1 | 11/2006 | Tomioka et al. | |
| 2007/0027972 A1* | 2/2007 | Agrawal et al. | 709/223 |
| 2007/0268516 A1 | 11/2007 | Bugwadia et al. | |
| 2008/0151856 A1 | 6/2008 | Glick et al. | |
| 2008/0154826 A1 | 6/2008 | Backof et al. | |
| 2009/0049159 A1 | 2/2009 | Boscovic | |

OTHER PUBLICATIONS

Jijun Lou et al., "Analysis of Combined Strategies Including Concepts, Algorithms and Reconfigurable Architecture Aspects," End-to-End Reconfigurability II—E2R II, Sixth Framework Programme, Jan. 12, 2006, 160 pages in 3 parts.

Muck et al., "Evolution of Wireless Communication Systems Towards Autonomously Managed, Cognitive Radio Functionalities," IEEE 64th Vehicular Technology Confernce, 2006, VTC-2006, Fall 2006, Sep. 25-28, 2006, pp. 1-5.

Leino, Anne-Tuulia "The future usage of radio spectrum for mobile communications", European Spectrum Management Conference 2006, Mar. 29-30, 2006, Brussels, www.umts-forum.org.

Menzel, Christian "Spectrum management between harmonisation and liberalisation", European Spectrum Management Conference 2006, Mar. 29-30, 2006, Brussels, www.umts-forum.org.

Long, Colin, "The protection of spectrum rights", European Spectrum Management Conference 2006, Mar. 29-30, 2006, Brussels, www.umts-forum.org.

Brodersen, et al. "CORVUS: a cognitive radio approach for usage of virtual unlicensed spectrum", White paper, Jul. 29, 2004.

Mangold, et al. "Cognitive radio—trends and research challenges", Comtec, Mar. 2005.

Marshall, Preston, "XG communications program information briefing", International Telecommunications Union study group 8, Sep. 2004.

Fournier, Eric, "Spectrum trading and liberalization: any difficulty?", European Spectrum Management Conference 2006, Mar. 29-30, 2006, Brussels, www.umts-forum.org.

Panel Discussion, "Assessing the future demand of spectrum and the dangers and opportunities to businesses that will be created", European Spectrum Management Conference 2006, Mar. 29-30, 2006, Brussels, www.umts-forum.org.

Pogorel, Gerard, "Radio technologies and spectrum policies 2006: a turning point?", 28th IDATE Int'l Conf., Nov. 14-16, 2006, LeCorum—Montpellier FR.

Pogorel, Gerard, "Radio spectrum policy and management: a turning point?", Communications & Strategies, No. 49, 1st quarter 2003, p. 109.

Rudra, Angsuman, "Cognitive radio: an evolution from software radio", VMEbus Systems, Dec. 2004.

Yuguchi, Kiyotaka, Panel Discussion: Transition and Implementation—Learning from the experiences of others, Spectrum policy: experience in Japan, European Spectrum Management Conference 2006, Mar. 29-30, 2006, Brussels, www.umts-forum.org.

Martigne, Patricia, "Cognitive radio: sharing spectrum the smarter way", European Spectrum Management Conference 2006, Mar. 29-30, 2006, Brussels, www.umts-forum.org.

Hahn, Rudiger, "A look at the future of spectrum regulation", European Spectrum Management Conference 2006, Mar. 29-30, 2006, Brussels, www.umts-forum.org.

Hewitt, Tim, "Ensuring the correct timing of transition to liberalised markets", European Spectrum Management Conference 2006, Mar. 29-30, 2006, Brussels, www.umts-forum.org.

Glick et al., U.S. Appl. No. 11/614,383, filed Dec. 21, 2006, Motorola, Inc.

Mitola, et al. "Cognitive Radio: Making Software Radios More Personal," IEEE Personal Communications, Aug. 1999, pp. 13-18.

Lewis et al., "Managing Policies for Dynamic Spectrum Access," D. Gaiti et al. (Eds): AN 2006, LNCS 4195, pp. 285-297, 2006. IFIP International Federation for Information Processing 2006. 13 pages.

Cooper, "Governing the Spectrum Commons: A Framework for Rules Based on Principles of Common-Pool Resource Management," Mar. 2006, 34 pages from http://cyberlaw.stanford.edu/attachments/GOVERNING%20THE%20SPECTRUM%20COMMONS.pdf.

Guo et al., "Investigation on Spectrum Sharing Technology Based on Cognitive Radio," 1st international Conference on Communications and Networking in China, 2006, ChinaCom '06, Oct. 25-27, 2006, pp. 1-5.

Haykin, "Cognitive Radio: Brain-Empowered Wireless Communication," IEEE Journal on Selected Areas in Communications, vol. 23, No. 2, Feb. 2005, pp. 201-220.

Newman et al., "Cognitive Engine Implementation for Wireless Multicarrier Transceivers," Wireless Communications & Mobile Computing, vol. 7, Issue 9, Nov. 2007, pp. 1129-1142.

Lee W. Young, "PCT/US2007/082523—PCT International Search Report," WIPO, ISA/US, Commissioner for Patents, Alexandria, VA, USA, Apr. 23, 2008, 1 page.

Beate Giffo-Schmitt, "PCT/US2007/082523—PCT International Preliminary Report on Patentability," The International Bureau of WIPO, Geneva, Switzerland, Jul. 2, 2009, 7 pages, most relevant pp. 2, 5-7.

* cited by examiner

METHOD AND APPARATUS FOR SETTING AND MANAGING OPERATIONAL DYNAMICS WITHIN COGNITIVE RADIO NETWORKS

CROSS-REFERENCE TO RELATED APPLICATIONS

The present application is related to U.S. Pat. No. 7,743,121 and to U.S. patent application Ser. No. 11/614,383 (filed on Dec. 21, 2006) and Ser. No. 11/614,424 (filed on Dec. 21, 2006).

FIELD OF THE INVENTION

The present invention relates generally to, in certain embodiments, the field of software defined radios and cognitive radios. More particularly, certain embodiments consistent with this invention relate to methods and apparatus for establishing an operational policy for such radios.

BACKGROUND

Radio communication technology has traditionally been based upon fixed frequency or spectrum assignments and fixed modulation techniques (as well as other regulatory agency established parameters). For example, a particular local government agency such as a police department might be assigned several frequencies for its use using frequency modulation for voice communication. Frequency spectrum could often be shared in order to more efficiently use the spectrum by, for example, sub-audible digital or analog coding embedded in the transmitted signals. Nevertheless, in such an environment, the assigned frequencies are off limits for use by others and usage would rarely approach full utilization. In fact, utilization might amount to only a few percent of the available communication throughput. As a result, frequency spectrum is inefficiently utilized, while simultaneously demand for bandwidth is ever increasing.

A new paradigm for dealing with such a problem is emerging in which a radio is provided with the intelligence to identify underutilized or unutilized spectrum and change its operational parameters to take advantage of the available spectrum while minimizing potential for causing interference. Such radios are commonly configurable and reconfigurable using software control and posses the intelligence to obtain the needed situational awareness to reconfigure in order to enhance spectrum utilization efficiency. Such radios have been dubbed cognitive radios—a form of software defined radio. Cognitive radios are envisioned to be able to cross geographic boundaries and adapt to regulatory changes associated therewith.

One issue that is to be addressed in producing a viable working cognitive radio is the issue of adaptation to new policies as a radio's situation or environment changes. This can happen, for example, by virtue of changes in a geographically static (stationary) environment as well as changes resulting from geographical movement of the radio (e.g., in an automobile or an airplane). The cognitive radio should be able to competently adapt to such situations.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
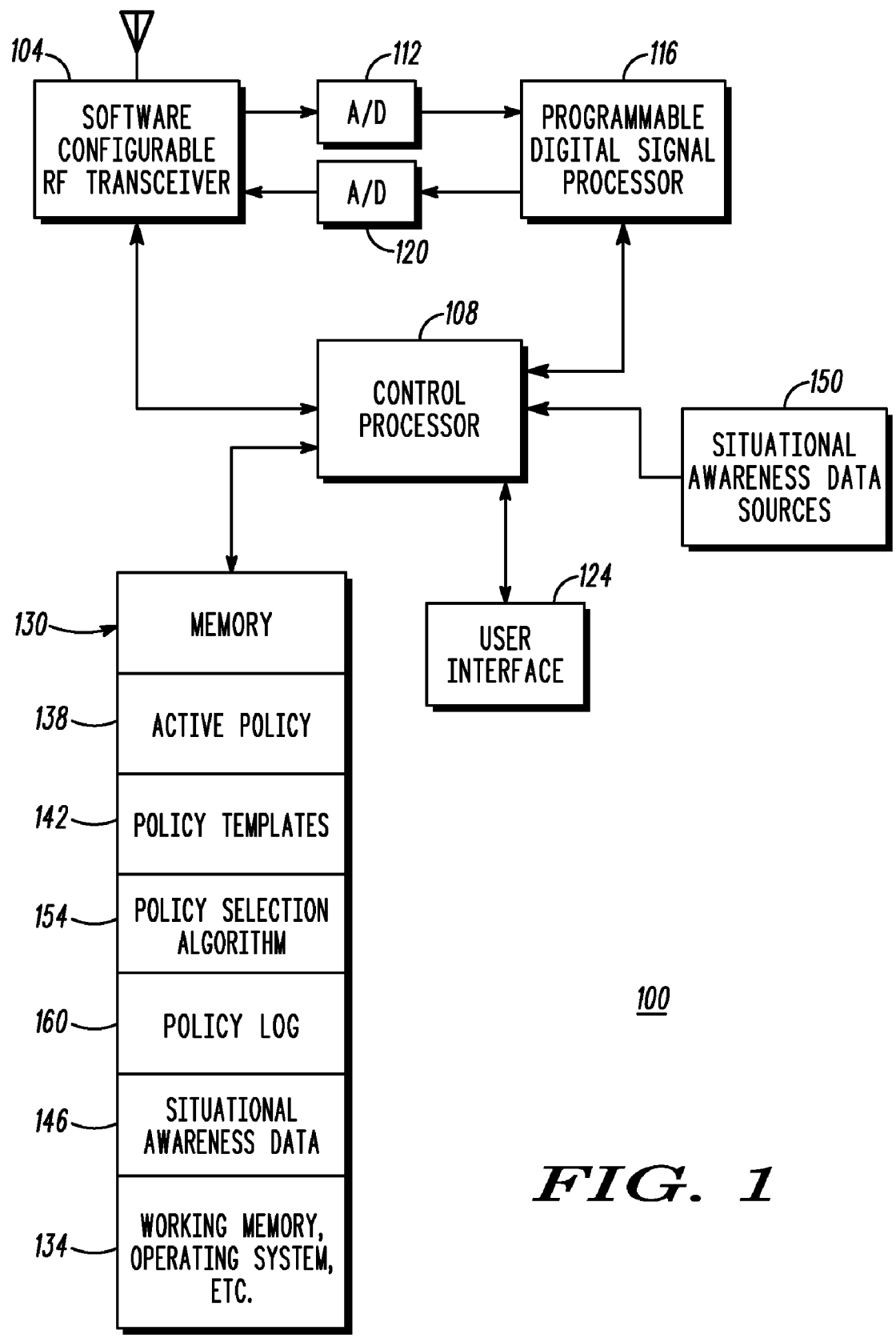
FIG. 1 is an example block diagram of a cognitive radio in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail example embodiments that are in accordance with the present invention, it should be observed that the embodiments reside primarily in combinations of method steps and apparatus components related to the cognitive radio and related processes. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the cognitive radio described herein. The non-processor circuits may include, but are not limited to, a radio receiver, a radio transmitter, signal drivers, clock circuits, power source circuits, and user input devices. As such, these functions may be interpreted as a method to perform functions such as acquisition of a new policy in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

For purposes of this document, it is assumed that the cognitive radios are operating using a trusted platform. That is, it is assumed that appropriate security measures have been taken to insure that a policy has not been tampered with in an unauthorized manner, and that communication between a cognitive radio another cognitive radio or other authority are trustworthy. This does not imply that information is always reliable, just that the information has not been spoofed or tampered with for malicious purposes. Additionally, the term "cognitive radio" should be interpreted to mean any wireless communication device that has cognitive radio attributes as described herein, and are not limited to conventional voice communication radio devices.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of this document, the term "policy" or "operational policy" is used to generically describe a rule or set of rules that define a parameter or a collection of parameters that specify a communication protocol and related specifications for use in radio communication. Those rules determine the type of waveforms used in modulation of information used for communication. Such policies and parameters thereof may be established or limited by convention, by agreement or by law. Examples of policies and components of policies include, but are not limited to, frequency or frequencies or frequency band, power limits, application, location, situation, wave shape, spectral characteristics, temporal characteristics, packet or other data formats, modulation technique, operational mode, coding, bandwidth, data throughput, encryption parameters and other communication parameters that might be used to specify the operation of a radio communication device.

A policy may be fully defined in some embodiments by a policy identifier or policy code, while in other embodiments; a policy may be identified by the specific parameters and specifications. In still other embodiments, the policy may be identified by a difference between two policies, or by policy identification with exceptions, or by compressed data explaining, defining or labeling the policy. Any number of other techniques may be devised to identify a policy without deviation from the principles governing embodiments consistent with the present invention.

For purposes of this document, the term "domain" or "policy domain" is intended to mean a geographical region or other operational constraint in which a particular policy is in force—generally by virtue of regulations established by a regulating authority (e.g., in the U.S., the Federal Communication Commission is one such regulatory authority). It is noted that a policy domain may include radio spectrum that is unregulated or is nearly unregulated, and which can be utilized in accordance with certain embodiments as well as licensed spectra.

For purposes of this document, the term "software defined radio" (SDR) is intended to mean a radio communication device whose operational parameters are established by software. Thus, an SDR may be configured and reconfigured under software control to comply with a particular set of operational parameters (i.e., a policy). An example SDR may operate in multiple bands and in multiple modes.

For purposes of this document, the term "cognitive radio" (CR) is used to mean a configurable radio such as a software defined radio that has the ability to configure itself for operation based upon its operational environment. That is, a CR is able to determine or seek out an operational policy applicable to its capability, location, applicable policies, laws, regulations, spectral congestion, likelihood of receiving or causing interference, and/or similar considerations. A cognitive radio can take many forms and have varying degrees of "situational awareness" that permits the cognitive radio to select (or have selected for it) an appropriate operational policy. The CR can then configure itself (or be configured) and operate to carry out radio communications according to the operational policy. The term "smart radio" is also sometimes used to describe this type of radio.

"Situational awareness" implies that the cognitive radio is aware of its operational environment to some degree. That situational awareness may be obtained by virtue of the CRs capability to sense parameters such as spectral utilization, or sense or be made aware of position and movement of the CR (e.g., in a car or plane by GPS signals or other means), or by virtue of querying of or receipt of updates from other nearby cognitive radios or other authorities to obtain such situational awareness. This situational awareness is used by the CR in order to establish or receive an appropriate operational policy for use in a given situation in order to achieve efficient or reliable communication.

An assumption to be used in considering the functioning of a cognitive radio is that a common signaling and communication mechanism should be available to all CRs (or at least all CRs in a particular collection of CRs). This assumption permits the cognitive radios to communicate at a basic level to permit configuration of a group of cognitive radios for communication among themselves and to exchange information contributing to situational awareness to aid in optimizing communication. Two possibilities are proposed for achieving this functionality. In the first, an agreed upon standard protocol is established in which all CRs possess the native ability to communicate. In the second, cognitive beacons are provided which act as translators between normally incompatible protocols to permit communication among cognitive radios. In either case, however, the present document presumes establishment and existence of such a common mechanism for communication between CRs. At this writing an accepted protocol has not been established, but it is clear that establishment of such a protocol is a formality and a matter of national and/or international regulatory agreement, convention, treaty, etc., with no substantial technical barriers to be overcome. The presence of agreements at this time on such a specified mechanism is not necessary to the understanding of the present embodiments.

FIG. 1 depicts a simplified embodiment of a software defined radio capable of operation as a cognitive radio 100. Such CR 100 incorporates a radio frequency (RF) transceiver 104 that is configurable under software control by instructions received from a control processor (e.g., a microprocessor or microcontroller) 108 in order to establish an air interface used by the transceiver 104 to carry out suitable communications. Received analog radio waves are downconverted by the receiver section of the RF transceiver 104 and converted to digital by A/D converter 112 for processing by a programmable digital signal processor (DSP) 116. Similarly, digital data (which may include digitized voice) is passed from the DSP 116 to D/A 120 for transmission by the RF transceiver 104's transmitter. Analog to digital and digital to analog conversion may be bypassed in certain embodiments of digital communication scenarios.

The programmable DSP 116 operates under control of control processor 108 which configures the DSP for the particular policy in use at the time. A user interface 124 provides audio or visual data to and from a user of the cognitive radio 100. Control processor 108 has an associated memory (or other suitable storage) 130 that stores instructions that are used to process the policy actions of the cognitive radio 100. Memory 130 includes working memory 134 carrying programs and operating system and satisfies other such storage requirements. A portion of memory 130 may also be reserved for storage of parameters of a currently active policy at 138. Another portion of memory 130 may be used to store policy templates (i.e., policies) at 142, while still another part of memory 130 may store situational awareness data at 146 used by the cognitive radio 100. Situational awareness data can be received from many sources including GPS data, data received via the receiver of RF receiver 104, user input, sensors, etc. For simplicity, this situational data are represented as coming from block 150, but the presence of a single block representing a source of this data should not be construed to be limiting in any way. Situational awareness data input are represented this way purely for conceptual convenience without regard for the hardware which might be employed to produce such data. A policy log 160 is also maintained according to certain embodiments in order to facilitate reuse of prior policy decisions that worked well in the past under similar or identical situations (e.g., location).

Memory 130 further incorporates, in certain embodiments, varying forms of policy selection algorithms 154 which depend upon numerous factors including, but not limited to, situational awareness data, reliability of situational awareness data, active policy, policy templates, logged policy data, etc.

Implementing policy changes in a cognitive radio is a complex issue involving many factors. In order to understand the complexity of the problem, it is instructive to consider several general operational considerations for a cognitive radio. First, one should recognize that as this technology evolves and as new CRs are developed and computing power available to the CR increases, a variety of CRs may be in communication, with each having varying knowledge, situational awareness, historical data and computing power. As a result, a cognitive radio should be able to adapt policy use decisions based upon a multitude of factors, not the least of which might be the ability to take advantage of a more powerful or more knowledgeable CR from which it can obtain valuable information to be used in establishing a suitable policy for a given situation.

Figure 2:
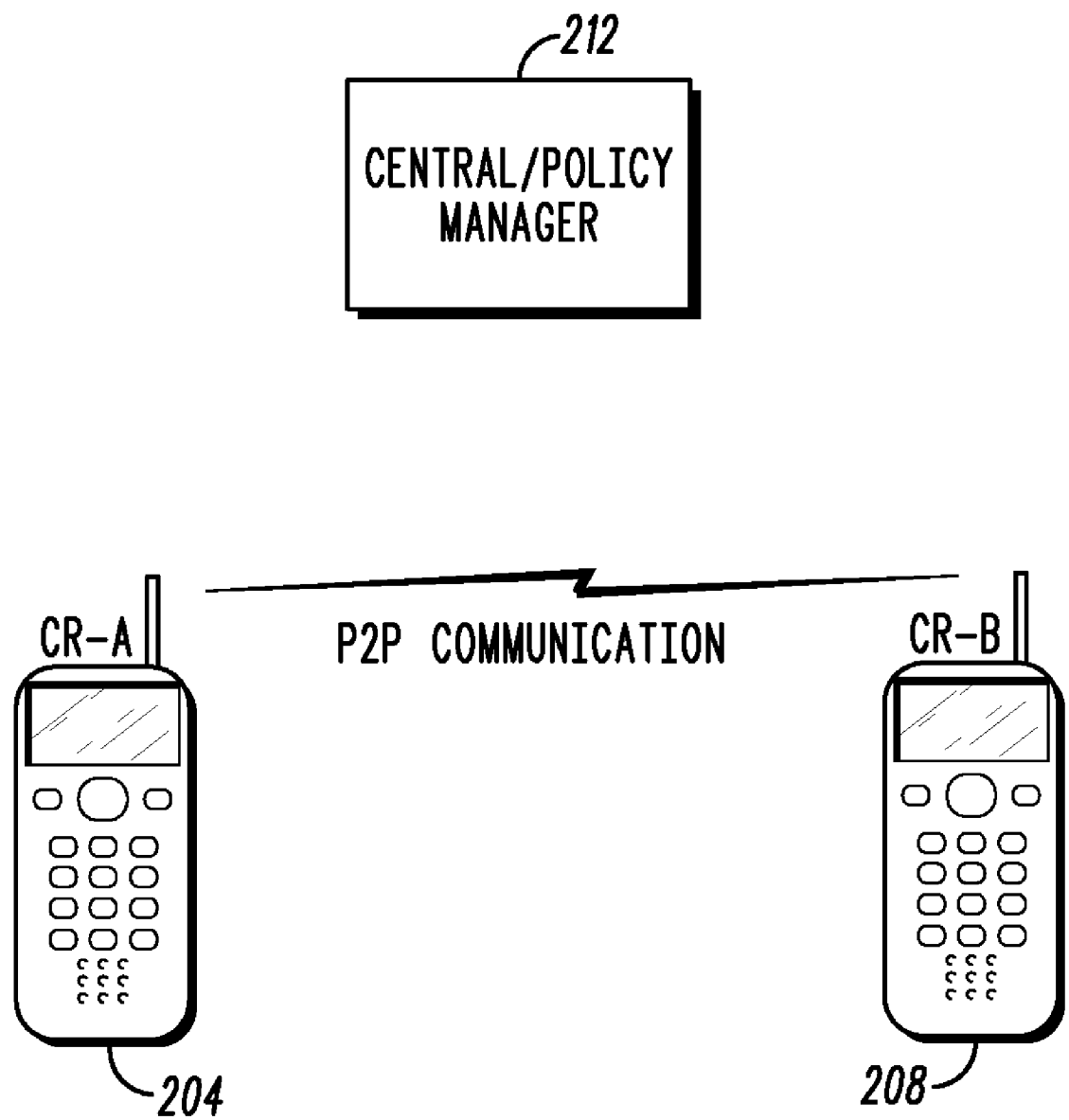
FIG. 2 is an example diagram illustrating a cognitive radio network in accordance with some embodiments of the invention.

Cognitive radios can be configured to operate in any number of ways. Consider FIG. 2 for example. In this example, a first cognitive radio CR-A (204) may directly communicate with a peer cognitive radio CR-B (208) in a so-called "point-to-point" (P2P) communication session. The cognitive radios may establish a suitable policy for use in this point-to-point environment via any number of techniques including, but not limited to, the cognitive radios' situational awareness, negotiation with each other, consultation with other cognitive radios in range, or consultation with a central (or local or regional) policy manager 212.

Figure 3:
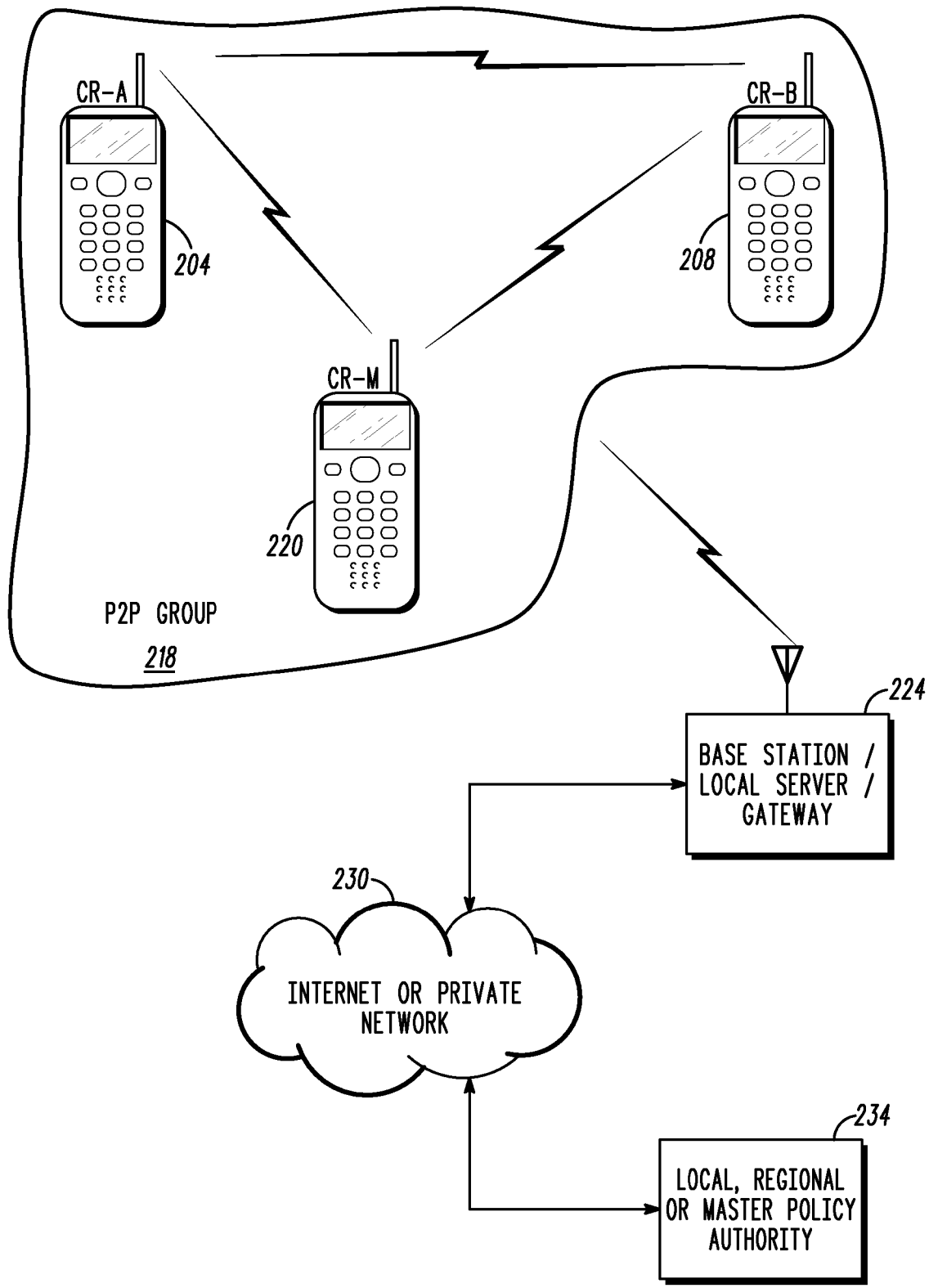
FIG. 3 is an example of another cognitive radio network in accordance with some embodiments of the invention.

Another, more elaborate, example environment for cognitive radio communication is depicted in FIG. 3 in which any number of hierarchies may be utilized for obtaining the situational awareness necessary for obtaining an appropriate operational policy. Generally speaking, the depicted hierarchy of authority in policy decision making increases from top to bottom in this illustration. In this example, a peer-to-peer group 218 is depicted as having three member cognitive radios—204, 208 and CR-M 220. In this example, the group 218 may operate as an autonomous communication group, or may utilize the services of a base station or repeater 224 in a more or less conventional manner once an appropriate policy is established for such communication. The reader is reminded that all cognitive radios are presumed to be able to communicate using a common signaling protocol in order to establish or change a policy.

In communication group 218, one member may be established as a "master" who can dictate policy to the others in the communication group. In this case, assume that CR-M (220) is such a master. If for any reason the master wishes to change policy (either autonomously, or under user instruction) CR 220 can dictate that change to the subordinate CRs 204 and 208 using appropriate signaling. Envision, by way of example, that CR 220 is controlled by a sheriff or military commanding officer, who deems that the policy should be changed to permit communication with a broader range of personnel operating together in an emergency situation or to adapt to loss of communication with a member of the group.

When base station 224 is in a position to assist with policy decisions, such decisions may be implemented either by assistance of the computing power available at the base station, or may be dictated by the base station, operating in the role of a more computationally powerful cognitive radio itself. Additionally, base station 224 may operate in the capacity of a gateway that utilizes either a private data network or the Internet 230 to obtain additional assistance, or policy instructions from a local, regional or master policy authority 234. Hence, a cognitive radio may take advantage of numerous resources at its disposal, in addition to any locally or internally generated situational awareness data available to it in order to make policy decisions.

Figure 4:
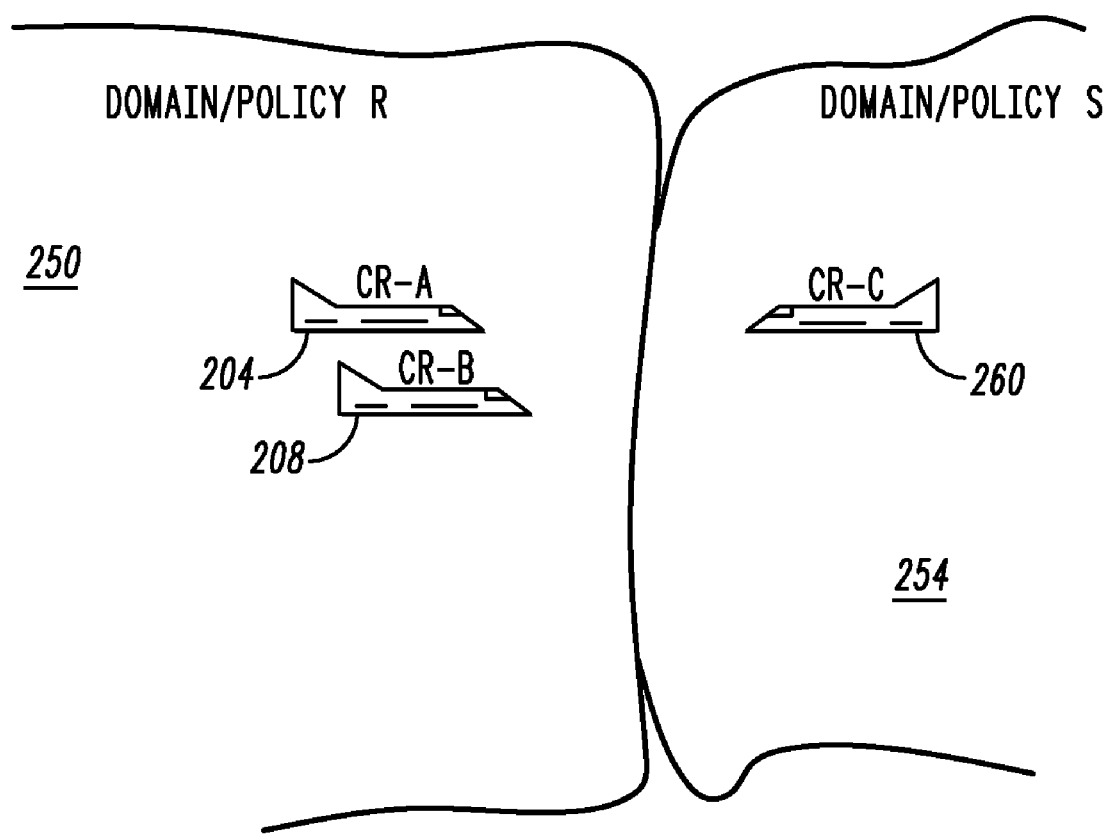
FIG. 4 is an example illustration of a change of domains of a cognitive radio in accordance with some embodiments of the invention.
Figure 5:
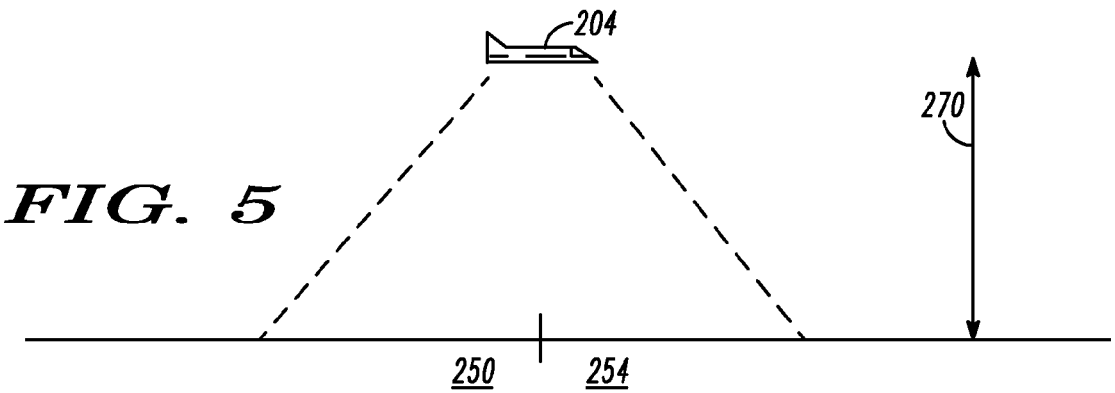
FIG. 5 is another example illustration of a change of domains of a cognitive radio in accordance with some embodiments of the invention.
Figure 6:
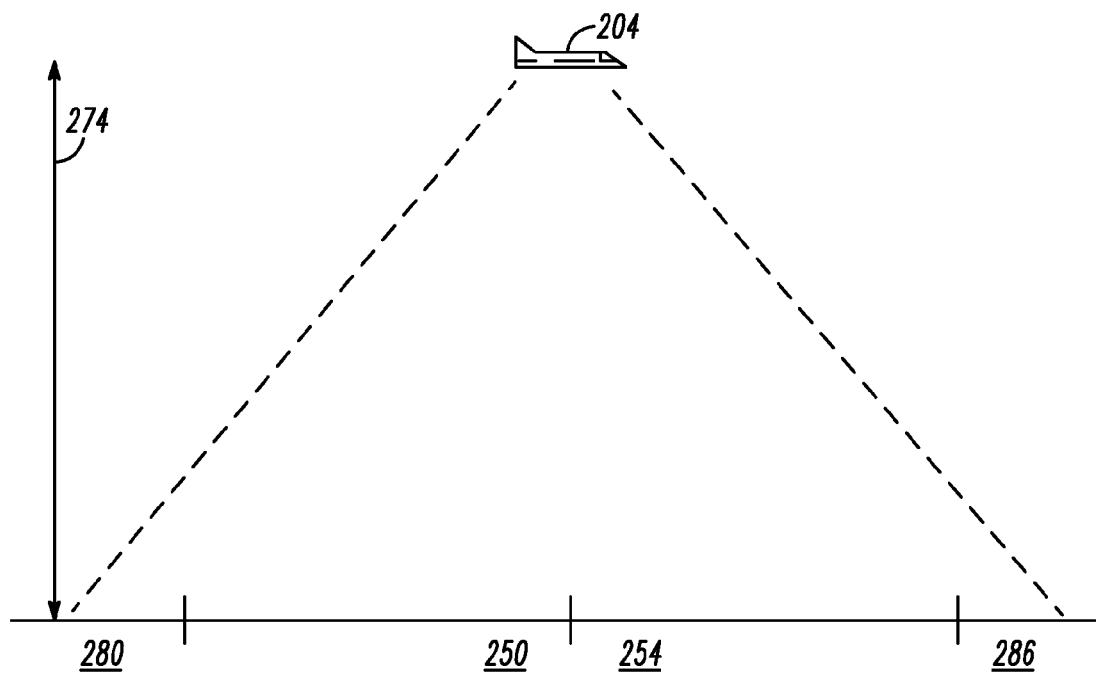
FIG. 6 is another example illustrating a change of domains of a cognitive radio in accordance with some embodiments of the invention.

Now consider the role of movement as depicted in FIG. 4-6 in making policy decisions. In this example, a pair of CRs (again 204 and 208) are in communication with each other. In this example, the cognitive radios are depicted as traveling from left to right within or as a part of an aircraft. This example could equally well have depicted those CRs traveling in an automobile, train, military vehicle, etc. CR 204 and 208 are shown to be currently operating within a domain 250 that uses policy R, but are approaching a domain 254 with policy S. This is most readily visualized as representing travel across the boundary from one nation to another wherein different regulatory authorities establish the rules of radio communications within their boundaries. Also depicted is a third CR 260 (CR-C) traveling from domain 254 toward domain 250 from right to left. Hence, CR 260 is operating under an appropriate policy S for domain 254. In this example, the CRs 204, 208 and 260 may modify their policies in any number of ways. For example, the various cognitive radios may travel this route frequently and may therefore have stored in their memory an appropriate set of policies and suitable information on when and how to change those policies as they approach the new domain. In other embodiments, the three CRs may query each other to determine an appropriate policy for use.

It should be noted that three policies may be required as the CRs make their way across the regulatory boundary into the adjacent domain. While in domain 250, one policy may be used, while in domain 254 another policy might be used and during their transition between domains, a third commonly workable policy might be used. Note that while a particular CR is near a border between domains, it may have to accept a compromise policy that may be undesirable for various reasons (e.g., congestion, poor throughput, etc.), but since near the border transmissions have the potential of causing interference the policy decision should take this into account. Once a domain barrier has been crossed and the potential for interference near the transitional region is gone or minimized, the policy may be changed again in order to maximize throughput.

The example of FIG. 4 is somewhat two dimensional, which may be a realistic assumption when, for example, the cognitive radios are transported via ground transportation, or when a border involves only two domains or even when the transmitted power is very low. This situation is further depicted in FIG. 5 in which the altitude 270 is relatively low or the border between domains is relatively isolated from other domain borders. However, consider the depiction of FIG. 6 in which the altitude 274 is much higher and more than two borders are involved. In this example, domains 250 and 254 are joined by domains 280 and 286 as being relevant to the receipt of transmissions from CR 204. One can readily envision areas, for example in Europe, where multiple boundaries converge in which the scenario depicted is realistic and to be contended with. Hence, the three dimensional aspect of the decision making for establishing a communication policy for CR 204 comes into play. In addition to compliance with regulatory issues associated with each domain, an effective communication mechanism may be needed which has suitable throughput for a particular application. Simultaneously, creation of interference should be avoided. Hence, geographical position in three dimensional space may need to be taken into consideration in order to establish an appropriate communication policy that meets a "least common denominator" constraint on a selected policy.

Figure 7:
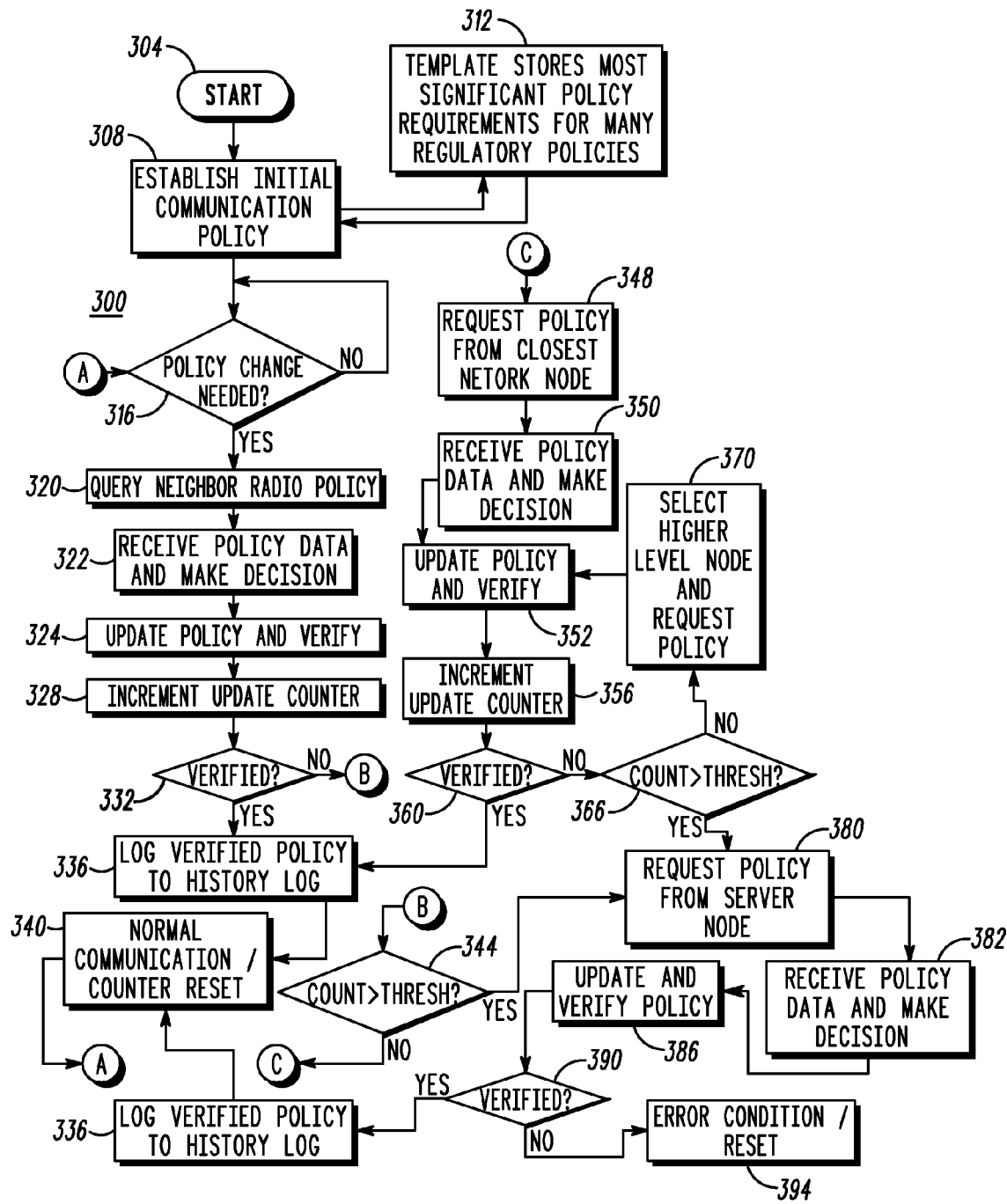
FIG. 7 is a flow chart of an example hierarchical process for changing policies of a cognitive radio in accordance with some embodiments of the invention.

Now consider an exemplary process for acquiring policy related information as depicted as process 300 of FIG. 7 starting at 304. When a cognitive radio is first activated, an initial operational policy is established at 308. Such policy may be based on policy templates stored in memory 130 at 312, as well as historical data and any situational awareness data that might be available. In certain embodiments, the initial startup may also involve transmission of a beacon, a response to which may dictate or suggest a policy or provide enhancements to existing situational awareness. In any event, an initial communication policy is established at 308 which is used until there is a determination at 316 that a policy change should be implemented. Such a determination may be based upon a number of factors including: time, 2 dimensional or 3 dimensional location, velocity and direction of travel, interference, communication quality or failure, data throughput, domain change, policy directives given by a local spectrum management authority in response to incident situations and other situational awareness data.

When a policy change is to be implemented at 316, an exemplary hierarchical approach involves first querying neighboring cognitive radios for policy information at 320. When this document discusses a query of a neighbor (or any other entity) for policy information, this should be interpreted to mean a broad range of potential queries. For example, the query can involve one way or two way communication of any or all of the following information: capabilities or class of the querying radio, position of the querying radio, velocity of travel or other information identifying impending domain change, identification of present policy in use, name or identifying code for the regulatory body having jurisdiction over the immediate area being approached, etc.

When this query is received by a neighbor CR, the neighbor may reply in any number of ways. For example, the response may involve communication of any or all of the following information: a code representing a full set of policy information being used by either the responding cognitive radio, a code representing a full set of policy information that is within the capabilities of the querying radio, a set of suggested or dictated policy parameters, a compressed set of suggested or dictated policy parameters, data representing a policy difference (e.g.—a message stating that the same policy can be used with power reduced from 5 watts to 1 watt), information relating to spectral congestion or interference in the domain being approached, a metric describing the reliability of information being provided, capabilities of the responding radio, situational awareness data, a radio identifier, etc.

Once the policy data are received at 322, a decision is made (unless the policy is dictated) as to the policy changes that are to be made. The policy is then updated and verified at 324 to assure suitable functionality of the new policy.

For purposes of this document, "verification" should be broadly interpreted as taking any action that determines or assures that a particular policy is suitable for use in a given environment by a particular cognitive radio. Verification can include, for example, validation that the policy is from a trusted source and that the policy data were received without error. It may include an issued date and time stamp to be used as a freshness measure and possibly also be marked with a period of validity. Verification may also include comparing the policy requirements to the capability of the CR. If they are incompatible, then the policy is not verified. Updating a policy can be construed as either modification of an existing policy or replacing a policy with a new policy.

A policy update counter can then be incremented at 328 in order to keep track of attempts at establishment of an operative policy. At 332, if the policy is verified as suitable, the policy is logged to the policy log along with data identifying appropriate situations for its use (e.g. time, position, velocity, etc.) at 336. Normal communication functions then ensue at 340 and the update counter is reset. Control then returns to 316 to await the next policy change.

However, in the event the policy is not verified at 332, the count of the update counter is compared with a threshold at 344. If the established threshold for number of attempts to update the policy with a viable policy has not been reached, either the process can return to 320 to find a new peer neighbor radio with better information (not shown for ease of illustration), or the policy request can be escalated to a network node (as depicted in this example) at 348. Hence, at 348, a network node (or similar higher level authority) is queried (e.g., a local base station or master or through a local base station or via point-to-point communication).

Policy information is then received at 350 and a new policy decision can be made. The policy is then updated and verified at 352 and the update counter is incremented at 356. If the new policy is verified at 360, control passes back to 336. Otherwise, control passes to 366 for another inspection of the policy update counter. If the threshold count has still not been reached at 366, then control passes to 370 where a higher level authority can be sought and selected to request new policy data. The process then repeats starting at 352. (In a similar manner, multiple neighbor peer radios can be repeatedly queried until a count is exceeded—this process has been omitted to simplify the flow diagram).

When an update count exceeds (or meets) the threshold value, control passes to 380 where a policy request is sent to the highest level server node that can be reached. Policy data are then received at 382 and a new policy decision made. The policy is then updated at 386 and if verified at 390, control passes to 336. If this policy cannot be verified at 390, an error condition is presumed to exist at 394. This can result in any number of corrective actions including a full software reset of the radio and/or presentation of alerts or other error messages.

As previously implied, a cognitive radio CR should quickly identify the policies that apply to it based on its current location, movements and time of day, for example along with other parameters. This is particularly important for rapidly-moving radios, such as is found in aircraft traversing multiple countries or governing authorities. The radio should determine in real time whether it can transmit, and under what conditions should be used for transmission at its current location and time. The CR establishes a usage policy (for example by download from a database in an associated network, or by the process just outlined). A particular policy may only be valid for a certain geographic area. Hence, the cognitive radio can predict when a new policy will be needed as a function of its current location (in two or three dimensional space), signal propagation and a speed and direction of movement. Based upon this data an approximate expiration time can be calculated based on its current location and speed. Also, by sensing its altitude along with its known latitude/longitude (or other location coordinates), the CR can estimate transmit (Tx) propagation and thus decide how often to request a policy update/download.

It is noted that once the CR determines how long a current policy can remain in effect, it has several tasks to accomplish. First it should determine what process will be used to determine a new policy. Then the new policy has to be determined, and finally, the new policy is programmed into the cognitive radio device. The amount of time available until the policy change and resources available may, in part, determine how the available time will be utilized. For example, if very little time is available, a quick method of selection of a new policy may be required, even though it may not provide an optimal new policy. When a large amount of time is available, a more complex policy making decision may be utilized. Additionally, a minor policy change may be more quickly programmed than a complete new policy. Each of these factors, taken in the context of the computational power available in the CR contributes to a decision as to how a new policy will be determined. Any element or combination of the above elements are considered to be "implementing" the policy, in accordance with certain embodiments.

As noted earlier, policy updates can either be downloaded from the network, or the CR can query neighboring CR's to obtain policy updates (in various formats such as a compressed, difference format). This latter approach is presumed to provide a much quicker update compared to downloading the entire policy from the network. Using the location, time, and propagation estimates, the CR chooses the most viable frequency and protocol (etc.) to use and verifies that the various attributes of the defined policy are available/unused. The CR maintains a history log with policy, location, and interference info to assist in quickly determining how to best communicate (i.e. skip propagation estimate and/or policy update request if CR has already traveled this path before), using coarsely-quantized locations to save storage space. If a new policy is needed but one is not available for this location from either the network or neighboring radios, the CR will compare the last-used policy with a cached policy for the closest location to determine which subset of policy rules to apply. If after a policy change no valid data can be received (i.e., the policy is not verified), the policy used by the transmitter may be beyond this CR's capability, or their policies may be out of sync; the CR then transmits a trouble beacon signal to all. The network detects the beacon and attempts to resync all CR's with a policy usable to all (i.e. least-common denominator of usage capabilities).

Hence, in accordance with certain embodiments, the CR takes advantage of its location, capabilities, and info from neighboring CRs to rapidly determine the best policy for the geographic region. Local caching and decision-making may often eliminate the need to support frequent, large policy downloads.

As previously noted, a cognitive radio that is mobile may pass through a number of regions with different regulatory policies. One such example is an airborne communication system in flight above Western Europe. After identifying spectrum that is unused, it must evaluate the potential spectrum against a policy engine to ensure that its usage is compliant with the local regulations. However, the policy tables are complex, and policy conformance calculations take a long time to perform. The overhead of doing this per-packet is unacceptable. However, doing it less frequently (e.g., per session) could result in policy violations later in the session due to a change in location or other factors.

Several potential remedies can be used to manage the computation time that may be required to carry out such computations. In one embodiment, depicted in the flow chart of FIG. 8 starting at 400, an associative lookup table is created and maintained within the radio (i.e., a cache) at 406. This lookup table maps sets of policy inputs (available frequencies, position, time, etc.) to policy decisions. For each new packet at 410, an associative lookup is performed at 414 to determine whether a policy decision has already been evaluated for the current set of inputs (or in certain embodiments, for similar inputs). If so at 418, the cache is consulted and returns the previously computed decision at 422. This policy decision is then implemented at 426 for the current packet. If not at 418, the policy engine software that makes the policy decisions in processor 108 evaluate the policy at 430 and make an appropriate policy decision. This policy decision may be arrived at 434 by application of genetic algorithms or other heuristics to augment the cached tables and thereby arrive at a new policy decision. The computed result can then be stored in the associative lookup table at 440 for future use.

A genetic algorithm (GA) is a type of global search heuristic algorithm used to find approximate solutions to optimization and search problems. Such algorithms may be iterative by nature and produce results that evolve with further iterations.

In another embodiment, the heavy computation requirements can be offloaded to external servers, which have more computational power available. For quicker local decisions, the offboard (network-side) service can be used to do any required complex calculation and return a simplified decision tree for subsequent analysis on the device. Use of a simplified lightweight decision tree will reduce the latency but may need to be updated periodically. Various metrics can be used metrics (such as the severity of the penalty for non-conformance to policy) to govern the frequency of updates. By way of example, with lower power transmitted communications, it may be less critical that a particular policy be exactly followed than if higher power transmission is used. In another example, a government agency involved in protection of national security interests may incur no actual monetary penalty for non-compliance during an emergency situation, but would generally wish to assure compliance where possible to avoid interference with other communications. In certain embodiments the process can be streamlined by the cognitive radio making basic policy decisions based upon the policy decision tree and if computational resources are available, can then enhance the policy decision (e.g., for greater throughput, etc.) Alternatively, defaults and heuristics can be used to generate decisions within the device while awaiting the full policy decision from the server or when the server is unavailable. Any mechanism short of the most complex method (by any measure, e.g., time, computing resources, etc.) possible for a given cognitive radio device for making a policy decision can be considered a simplified process for purposes of the present discussion.

It may not always be possible to fully comply with a regulatory policy while simultaneously achieving reliable communication. In such instances, it may be at least desirable to minimize non-compliance with the regulatory policy. Minimizing non-compliance can take many forms. For example, if the regulatory policy sets a maximum power of 1 watt but 5 watts is used, this is better than 50 watts. Similarly, being out of compliance for 1 minute is better than 1 hour. Thus, minimizing non-compliance can be interpreted in any reasonable way that minimizes some parameter of non-compliance. By way of example, and not limitation, parameters that can be minimized can include time of non-compliance, penalty for non-compliance, instances of non-compliance and severity of non-compliance in any parameter including severity of penalty or difference between actual parameter used and allowable parameter.

A simplified policy decision tree, for purposes of this discussion, is a decision tree that eliminates certain policy decisions that can readily be ruled out for a given set of circumstances. For example, if certain frequency bands can be eliminated, or certain modulation schemes can be eliminated from the decision process that a cognitive radio uses to make a policy decision, the policy decision process can be done in less time with less powerful computational resources than would otherwise be required.

In another example, a decision tree can be arrived at by an exchange of information with the server or other authority. In such case, the server queries the radio (or the radio supplies with a decision tree request or policy request) the capabilities of the radio. The decision tree then can be appropriately devised to utilize only the capabilities of the cognitive radio. In one example embodiment, the server can query "are you capable of frequency hopping" if negative response, that branch of a decision tree can be eliminated. In other examples, if radio capabilities are categorized by class (e.g., each radio is associated with a class that defines its capabilities), then the radio only needs to communicate its class in order for the server to use this information to devise a simplified decision tree relative to the radio's location.

Figure 9:
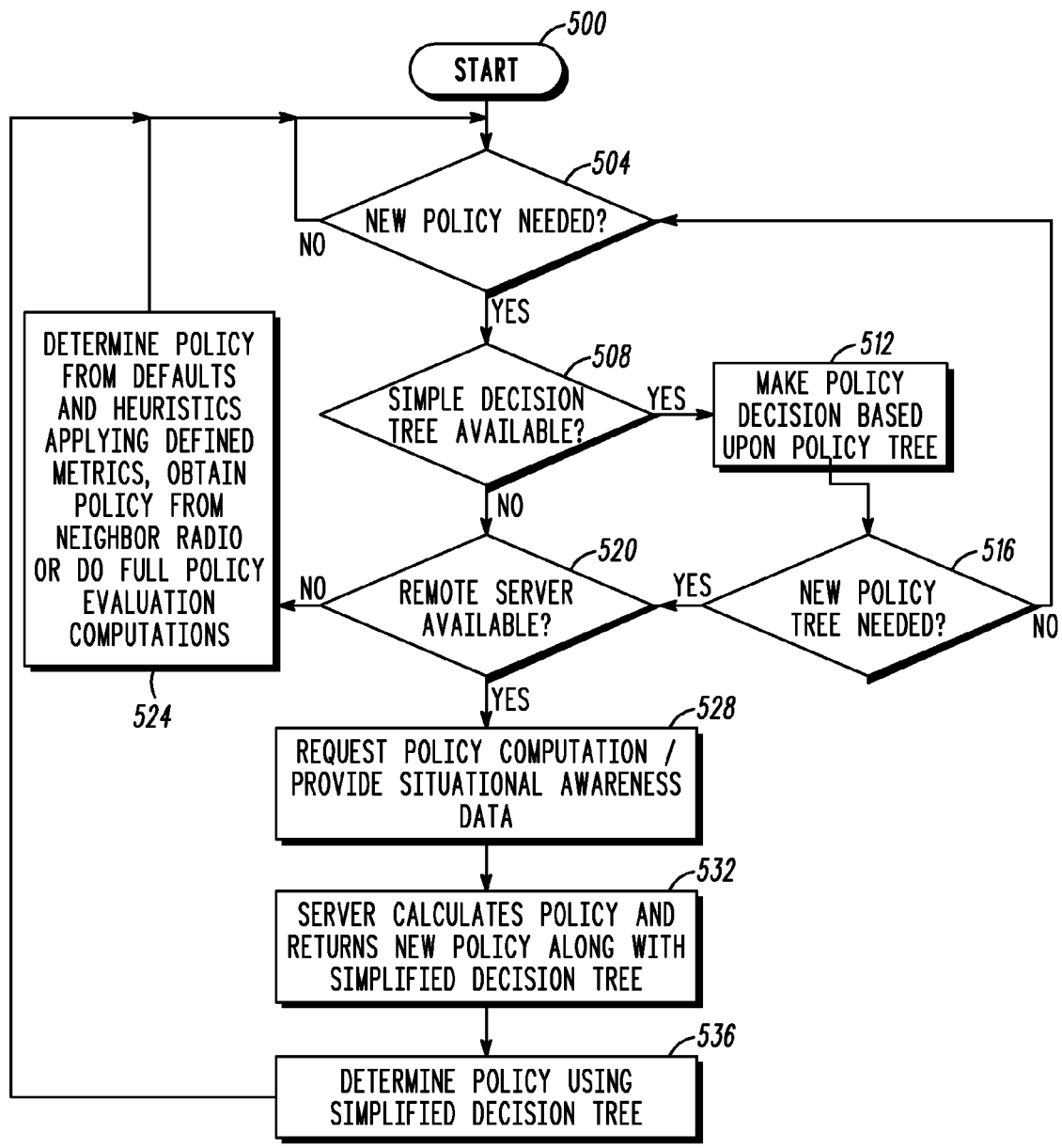
FIG. 9 is a flow chart depicting a policy decision process using simplified policy trees in accordance with some embodiments of the invention.

FIG. 9 depicts an exemplary embodiment of a decision process in accordance with this embodiment starting at 500 after which point, a determination is made that a new policy is needed (for any reason) at 504. If not, no new policy decision action is taken. If so at 504, the cognitive radio processor 108 determines if a simplified decision tree is available at 508 and if so, control passes to 512, where the policy decision is readily made using a simplified policy tree stored in memory as transmitted from a more computationally powerful source such as a ground based base station or internet connected server, or even a more powerful nearby cognitive radio. If there appears to processor 108 to be no need for an update of the simplified policy tree at 516, control returns to 504.

If a new policy tree is needed at 516, or if a simplified policy tree is unavailable at 508, processor 520 determines if a remote server capable of providing one is available (e.g., by broadcast of a beacon signal requesting such services). If no such services are available at 520, other actions can be taken such as using defaults or applying heuristics to the available information to arrive at a policy decision at 524. At the worst case, a full policy decision can be made independently by the cognitive radio at this point using all available resources including situational awareness. In certain embodiments, as previously described, other nearby radios can also be queried for policy data. Control then returns to 504.

If a remote server is available at 520 an updated policy computation and simplified policy decision tree can be requested from the available resources (e.g., a server with more computation power) at 528. The server then returns a calculated policy and/or a new simplified policy decision tree at 532. The cognitive radio then uses this information to determine a correct policy at 536.

Figure 10:
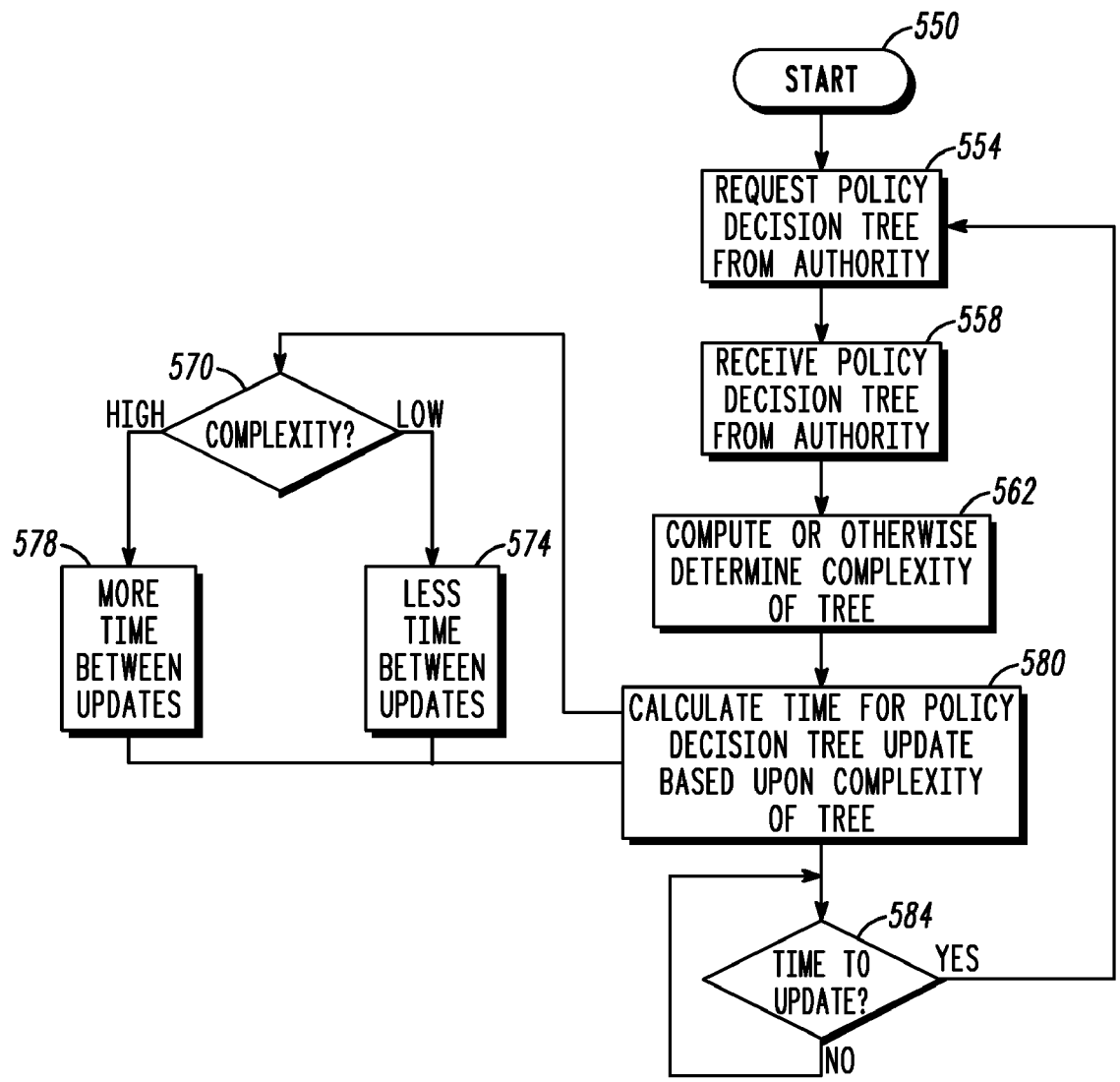
FIG. 10 is a flow chart depicting a relationship between complexity of a decision tree and frequency with which a new decision tree is updated in accordance with some embodiments of the invention.

In accordance with embodiments such as that of FIG. 9, it will be clear that a simplified decision tree can have varying degrees of complexity. In certain embodiments, a simplified decision tree might imply a simplified/local policy. In this instance, the degree of simplicity level of a given policy decision tree may be related to the update frequency required for the simplified policy decision tree. This concept is depicted in one embodiment by the process of FIG. 10 starting at 550 after which a request for a policy decision is transmitted to an authority (e.g., a server with greater processing resources) at 554. A policy decision tree is then received at 558 from the authority and implemented.

In the meantime, the cognitive radio computes (or, for example, reads from the message from the authority) a figure of merit for the complexity of the policy decision tree at 562. This figure of merit is then used at 580 to calculate a time for the next policy decision to be requested based upon the complexity of the decision tree. In one simple example, a threshold level of complexity can be established to make a decision between a relatively long time between updates versus a relatively short time between updates (actual times are not important to the understanding of this embodiment). If the complexity is deemed to be low at 570, less time is required between updates at 574, whereas if complexity is deemed to be high, more time is required between updates at 578. While depicted as a high or low decision, a full continuum of update times can be computed. Moreover, rather than a figure of merit, an actual update time can be determined by the authority and transmitted rather than a figure of merit, in certain embodiments. Once the update time is calculated at 580, the processor 108 monitors the time and when the update time arrives at 584 (or a timer expires), control returns to 554 for a new update cycle.

In addition to the pure complexity of the decision tree, other factors can be used (and may be considered a factor in determining "complexity" for purposes of this document. For example, the number of branches or nodes in the decision tree can be or be used in calculation of a complexity. Additionally, various "costs" can be associated with making a determination of complexity including a cost associated with throughput or even a cost of non-compliance with a particular policy (e.g., use of unlicensed or licensed spectrum, and penalties associated therewith, either monetary or in terms of performance).

In certain embodiments of cognitive radio, it may be desirable or required by regulatory agencies or the situation to compute a new policy for each packet transmitted. Clearly this is a burdensome requirement that has potential to rapidly consume computing resources. However, it should be noted that even when such is not a requirement of situation or regulation, a packet being the smallest unit of data may dictate that a packet-by-packet computation may be needed, or at least an evaluation of the policy on a packet-by-packet basis may be advisable.

In such circumstances, in accordance with certain embodiments, a policy decision can be computed on a per session (rather than per-packet) basis. In this embodiment, computation of the policy can be simplified safely by computing a bound on session length as a part of the policy evaluation. In this manner, i.e., the end point of the session can be computed so that based upon the frequency, protocol, geographic location, movement, velocity, direction, etc., the session ends before a new policy decision is required.

Figure 11:
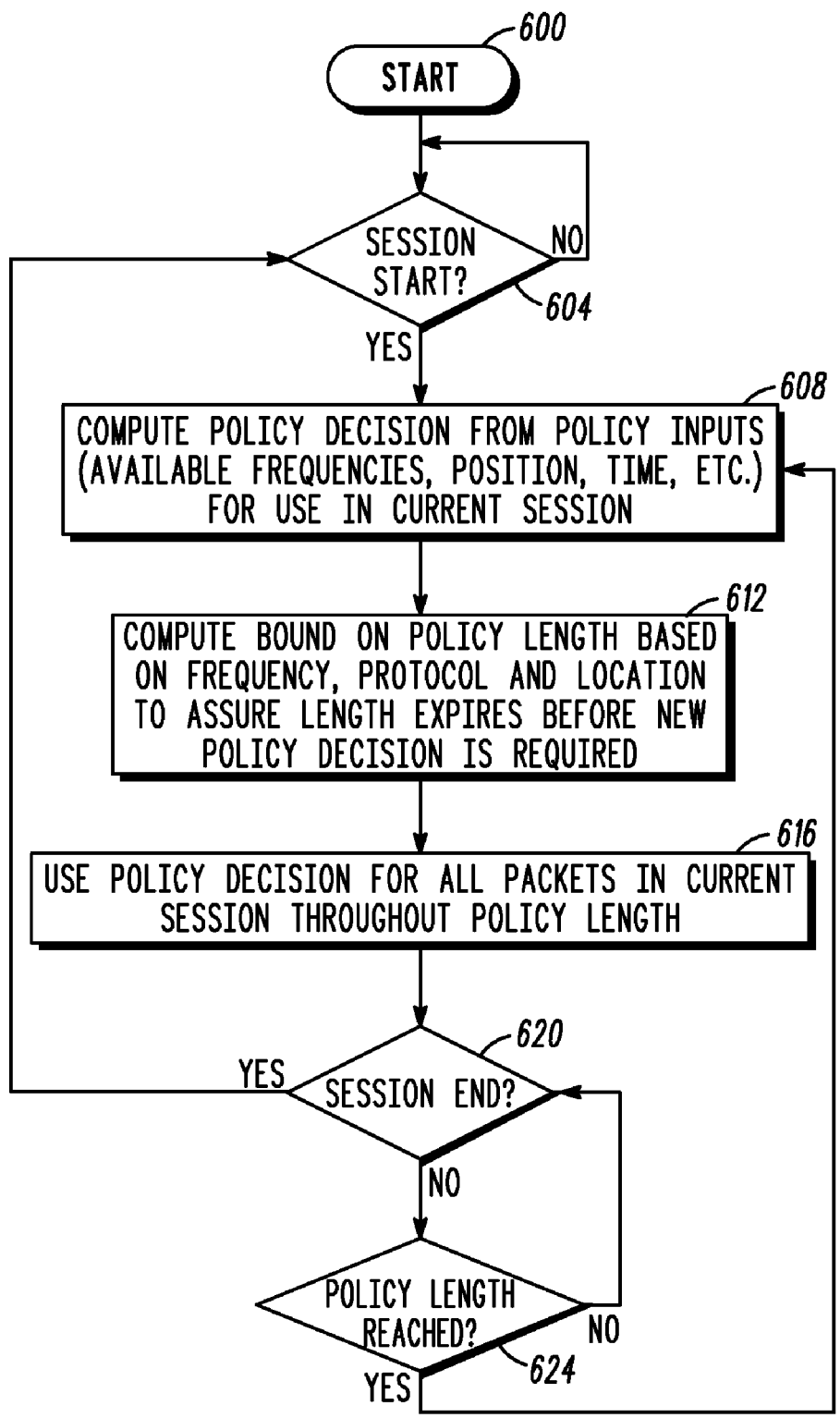
FIG. 11 is an example of a session based policy making process in accordance with some embodiments of the invention.

An exemplary process that carries out a session based policy decision is shown in FIG. 11 starting at 600 after which as session starts at 604. At 608 a policy decision is made base upon any of the mechanisms described heretofore. Additionally, data are gathered that will impact a suitable end point for the session such as speed and direction of travel and new domains being potentially approached, network topology, network boundaries or any other relevant data available to the cognitive radio at 608. At 612, this data are used to compute a bound on the length of time that a session can remain active before a new policy is to be implemented. The policy decision can then be implemented at 616 and used for the duration of the computed policy session length. If the session ends at 620 for any reason other than the computed end of the policy length, control returns to 604 to await the start of a new session. However, once the policy length is reached at 624, control returns to 608 where the process of calculating a new policy and a new policy length is restarted.

Figure 12:
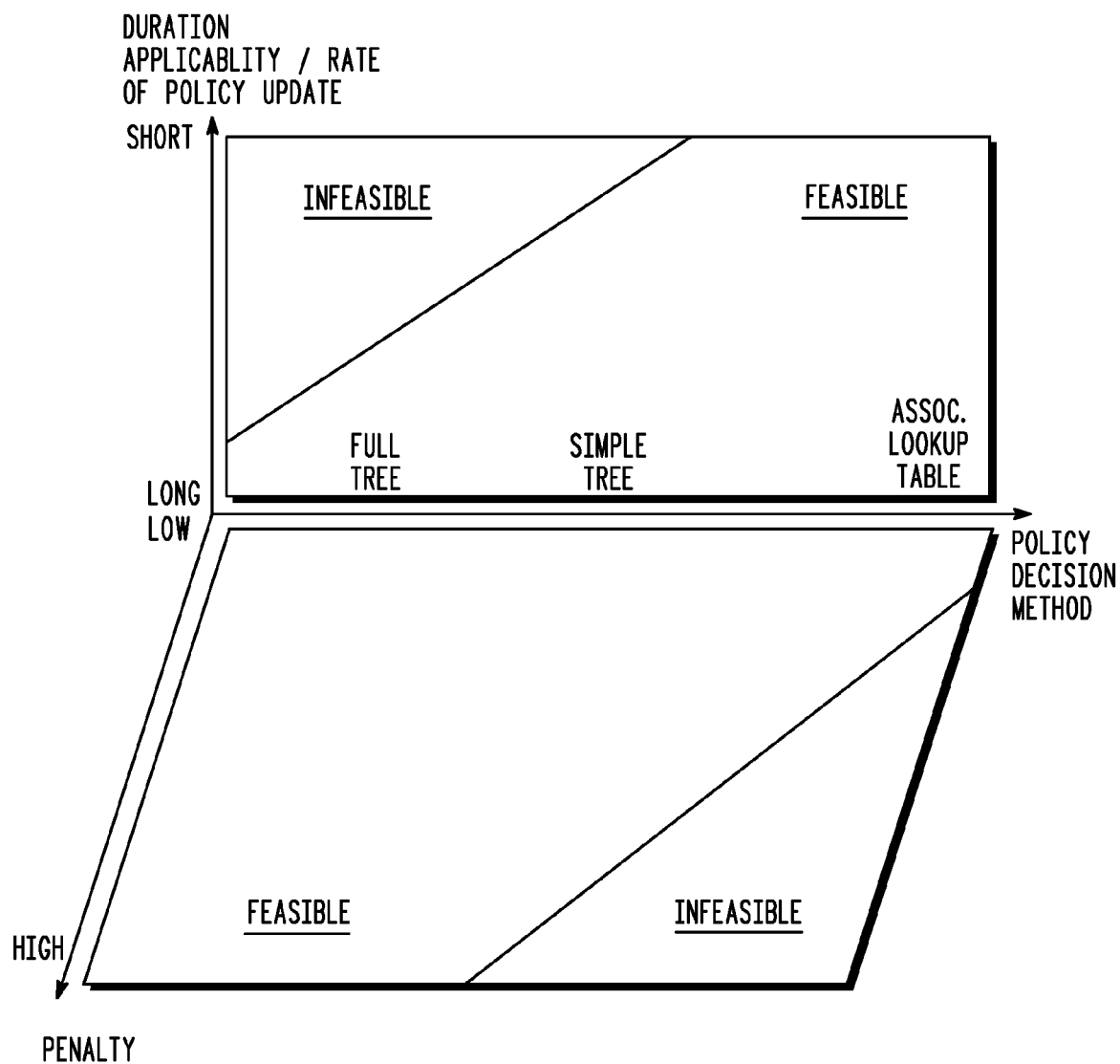
FIG. 12 is a graphical representation of the factors that can enter into a decision making process selection in accordance with certain embodiments of the present invention.

Referring now to FIG. 12, a graph depicts a simplified illustration of some of the parameters to be considered in making a policy change decision and their interrelationship. The X axis depicts three exemplary mechanisms for making a policy change, with the three example mechanisms being arranged by speed of decision making with decision times decreasing with travel to the right. Only three decision making processes are depicted for simplification of the illustration, but those skilled in the art will appreciate upon consideration of the present teachings that many decision making processes could be arranged along the X axis by order of time required to make the new policy decision. The Y axis represents the estimated or actual duration of applicability of the policy or, by analogy, the rate of policy updates required. The Z axis represents a cost or penalty for non-compliance with a policy (e.g., in terms of monetary cost or any given performance parameter).

If time for evaluation is no object, and the penalty for non-compliance is high, the cognitive radio device would give preference to the full tree policy evaluation for making a policy decision (or other mechanism that results in full regulatory compliance as well as optimization of other factors. The cognitive radio can either perform the calculation itself or offload the calculation to a server or other authority with higher computing power. Since time is not critical, there is no problem with the decision making process taking time and expending processing power.

As time available for the evaluation gets shorter to the point that the CR does not have time to perform the full tree evaluation, the CR reverts to a more rapid decision making processes such as using a simplified tree or a lookup table or cache. In the case of a simplified tree, this may mean that tree updates are required more frequently. Moreover, the updated policy may not be fully compliant with regulatory policies or may need to be updated on a more frequent basis.

When evaluation time becomes very short, the CR uses the associative lookup table unless the penalty for non-compliance with a regulatory policy is so high so as to not be worth the risk. Using this simplification of the process, the choice is feasible if it is feasible in both planes. If the choice is infeasible in either plane, then the choice is infeasible. Although this graph is a simplification of this decision making process, it conveys the general concepts of the tradeoffs that are made in selecting a decision making process. As such, it should be considered a simplified model, and more complex models may take different factors into account. So, while the present simplified model depicts selection of a decision making process in three dimensional space, multiple additional dimensions or alternate dimensions or fewer dimensions may be suitable for certain embodiments without departing from embodiments consistent with the present invention.

While depicted as a continuum in FIG. 11, the various conditions for selection of a method for determining what policy decision making process is used can actually involve more discreet steps than is illustrated. For example, the decision between processes can be made based upon the duration of applicability as compared to a set of thresholds for time needed to make the decision using any of several decision making processes. In the simplest variation, if the duration of applicability of the policy is long enough, the full tree process is used. Although most time consuming, it is presumed to have the highest likelihood of yielding a policy decision of long duration with optimized parameters such as minimal interference and higher throughput without non-compliance penalty. Similarly, a cost or penalty is likely to be defined in discrete terms (financial or throughput increments, for example), and again, comparison to thresholds may be a straightforward mechanism for establishment of a criterion for selection of a decision making process.

Thus, a method for managing operational parameters of a cognitive radio device to minimize non-compliance with a regulatory policy involves sensing a change in an operational condition that will affect compliance with a current operational policy; estimating a time at which the current operational policy will become invalid; selecting a method for determining how to update the current operational policy; and updating the current operational policy of the cognitive radio device. In certain embodiments, the selected method for determining how to update the current operational policy can involve determining a policy from a history of operational policy compliance; determining a policy from a time available to implement an updated policy; determining a policy by evaluation of a penalty for non-compliance with a regulatory policy; determining a policy by implementing a full policy; determining a policy by retrieving a cached policy; determining a policy from a policy decision tree; determining a policy from a simplified policy decision tree; determining a policy by selection of a simplified policy; determining a policy by selection of a default policy; etc. The time estimate for validity of the policy may be based upon geographic location, altitude, time of day, velocity, trajectory, etc. of the cognitive radio device as well as changing conditions of movement and location (differing local rules and policies), as well as any other situational awareness information.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A cognitive radio device comprising:
   a software configurable transceiver; and
   a control processor that is configured under software control to manage operational parameters of the cognitive radio device to minimize non-compliance with a regulatory policy by:
   sensing a regulatory domain boundary that will affect compliance with a current regulatory policy;
   estimating a time at which the current regulatory policy will become invalid, wherein estimating is based upon at least one of: a complexity of the current regulatory policy, a capability of the cognitive radio, and a penalty for non-compliance with a regulatory policy;
   determining how to update the current regulatory policy; and
   updating the current regulatory policy of the cognitive radio device.

2. The cognitive radio device according to claim 1 wherein determining how to update the current regulatory policy comprises determining a regulatory policy from a history of regulatory policy compliance.

3. The cognitive radio device according to claim 1 wherein determining how to update the current regulatory policy comprises determining a regulatory policy based upon a time available to implement an updated regulatory policy.

4. The cognitive radio device according to claim 1 wherein determining how to update the current regulatory policy comprises determining a regulatory policy by evaluation of a penalty for non-compliance with a regulatory policy.

5. The cognitive radio device according to claim 1 wherein determining how to update the current regulatory policy comprises determining a regulatory policy by determining a time needed for implementing a full regulatory policy.

6. The cognitive radio device according to claim 1 wherein determining how to update the current regulatory policy comprises determining a regulatory policy by retrieving a cached regulatory policy.

7. The cognitive radio device according to claim 1 wherein determining how to update the current regulatory policy comprises determining a regulatory policy from a regulatory policy decision tree.

8. The cognitive radio device according to claim 7 wherein the regulatory policy decision tree comprises a simplified regulatory policy decision tree.

9. The cognitive radio device according to claim 1 wherein determining how to update the current regulatory policy comprises determining a regulatory policy by selection of a simplified regulatory policy.

10. The cognitive radio device according to claim 1 wherein determining how to update the current regulatory policy comprises determining a regulatory policy by selection of a default regulatory policy.

11. The cognitive radio device according to claim 1 wherein updating the current regulatory policy comprises obtaining a regulatory policy decision from an authority with greater computing power than the cognitive radio.

* * * * *

UNITED STATES PATENT AND TRADEMARK OFFICE
CERTIFICATE OF CORRECTION

| | |
|---|---|
| PATENT NO. | : 7,970,430 B2 |
| APPLICATION NO. | : 11/614403 |
| DATED | : June 28, 2011 |
| INVENTOR(S) | : Backof, Jr. et al. |

It is certified that error appears in the above-identified patent and that said Letters Patent is hereby corrected as shown below:

In Fig. 7, Sheet 6 of 11, for Tag "348", in Line 3, delete "NETORK" and insert -- NETWORK --, therefor.

Figure 8:
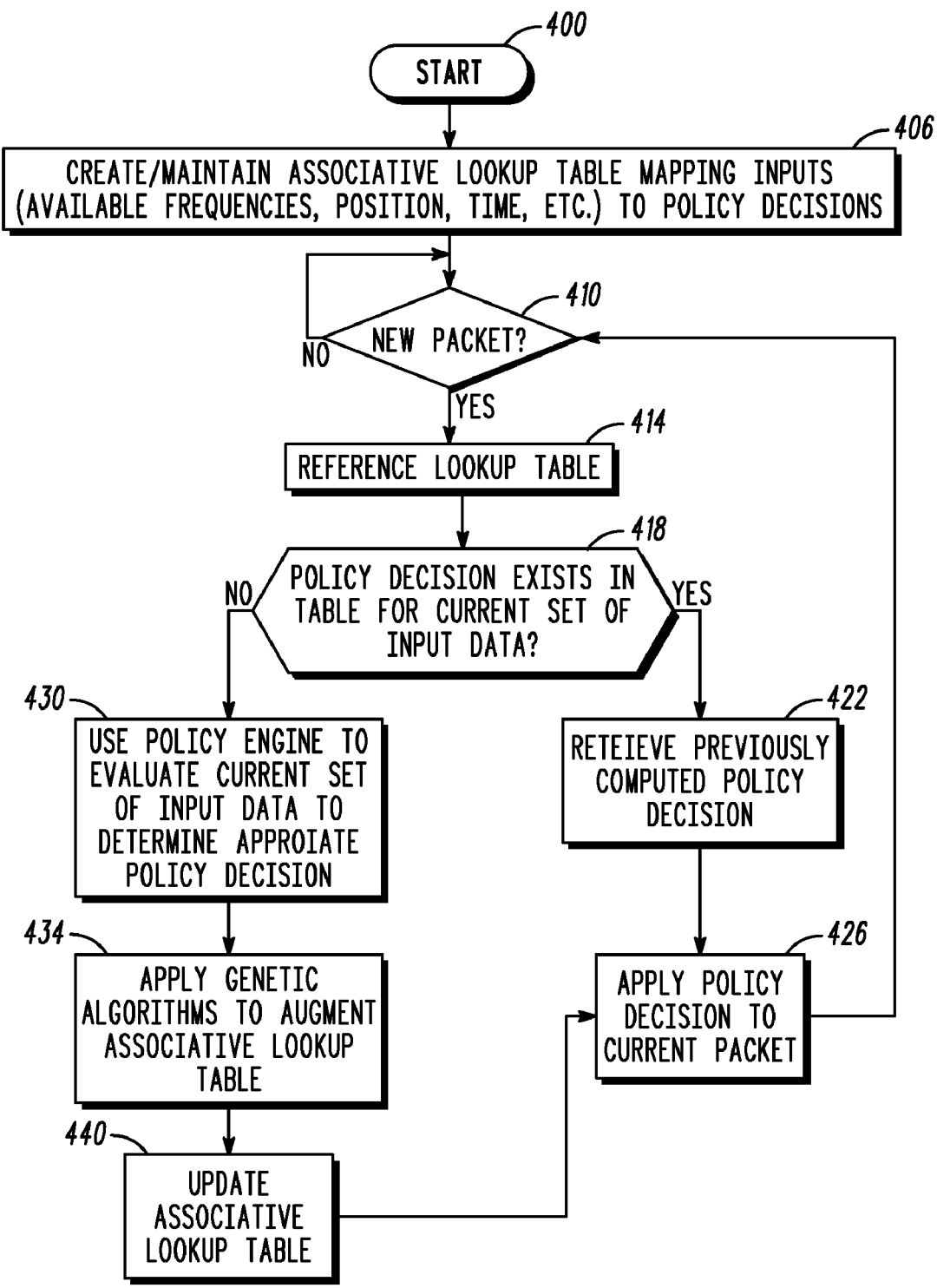
FIG. 8 is a flow chart depicting a session based policy decision process using cached policy information in accordance with some embodiments of the invention.

In Fig. 8, Sheet 7 of 11, for Tag "422", in Line 1, delete "RETEIEVE" and insert -- RETRIEVE --, therefor.

In Fig. 8, Sheet 7 of 11, for Tag "430", in Line 4, delete "APPROIATE" and insert -- APPROPRIATE --, therefor.

In Fig. 12, Sheet 11 of 11, Line 2, delete "APPLICABLITY" and insert -- APPLICABILITY --, therefor.

Signed and Sealed this
Fourth Day of December, 2012

David J. Kappos
*Director of the United States Patent and Trademark Office*